United States Patent [19]
Honnold

[11] 4,098,347
[45] Jul. 4, 1978

[54] REAR FOLDING IMPLEMENT

[75] Inventor: Darrel Lee Honnold, Winterset, Iowa

[73] Assignee: Deere & Company, Moline, Ill.

[21] Appl. No.: 758,664

[22] Filed: Jan. 12, 1977

[51] Int. Cl.² ............................................. A01B 73/00
[52] U.S. Cl. ............................... 172/311; 280/411 A; 280/656
[58] Field of Search .............................. 172/311, 456; 280/411 R, 411 A, 411 B, 411 C, 412, 413, 639, 656; 56/228, 385; 111/54, 55

[56] References Cited
U.S. PATENT DOCUMENTS

| | | | |
|---|---|---|---|
| 3,774,693 | 11/1973 | Orthman | 172/311 |
| 3,948,327 | 4/1976 | Parker et al. | 172/311 |
| 4,023,623 | 5/1977 | Anderson | 172/311 |

FOREIGN PATENT DOCUMENTS

| | | | |
|---|---|---|---|
| 47,374 | 5/1933 | Denmark | 56/385 |
| 445,389 | 5/1975 | U.S.S.R. | 56/228 |

Primary Examiner—Richard T. Stouffer

[57] ABSTRACT

A tool-carrying implement having a center section and a pair of outer sections extending transversely from opposite ends of the center section. The center section supports a pair of carriers that shift transversely on the center section and each carrier supports a vertical pivot at its inner end. The inner ends of the outer sections are connected with the respective outer ends of the carriers and a hydraulic cylinder is provided on the center section for shifting the carriers transversely to swing the outer sections rearwardly about the pivot and rotate the tools carried on the outer sections behind the tools carried by the center section to avoid interference therebetween.

25 Claims, 7 Drawing Figures

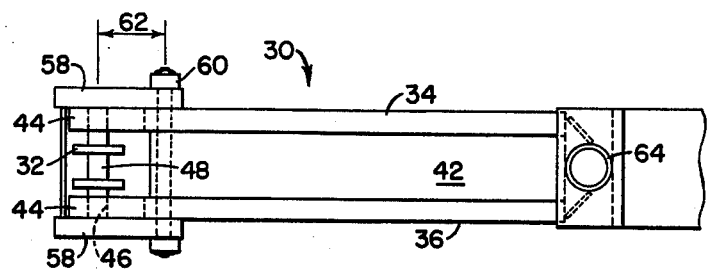
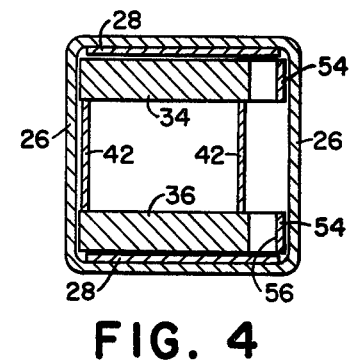
FIG. 3
FIG. 4
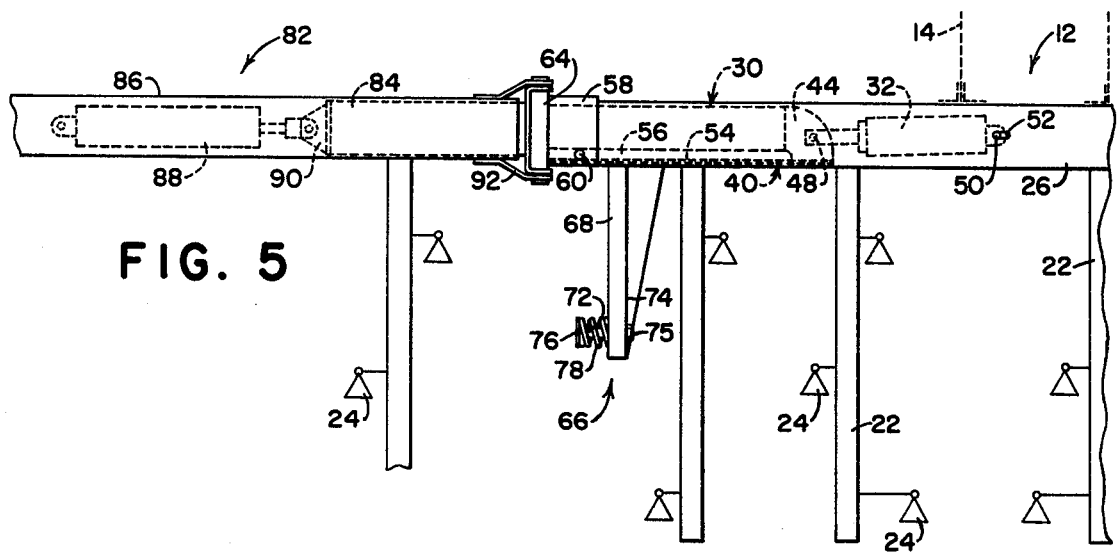
FIG. 5
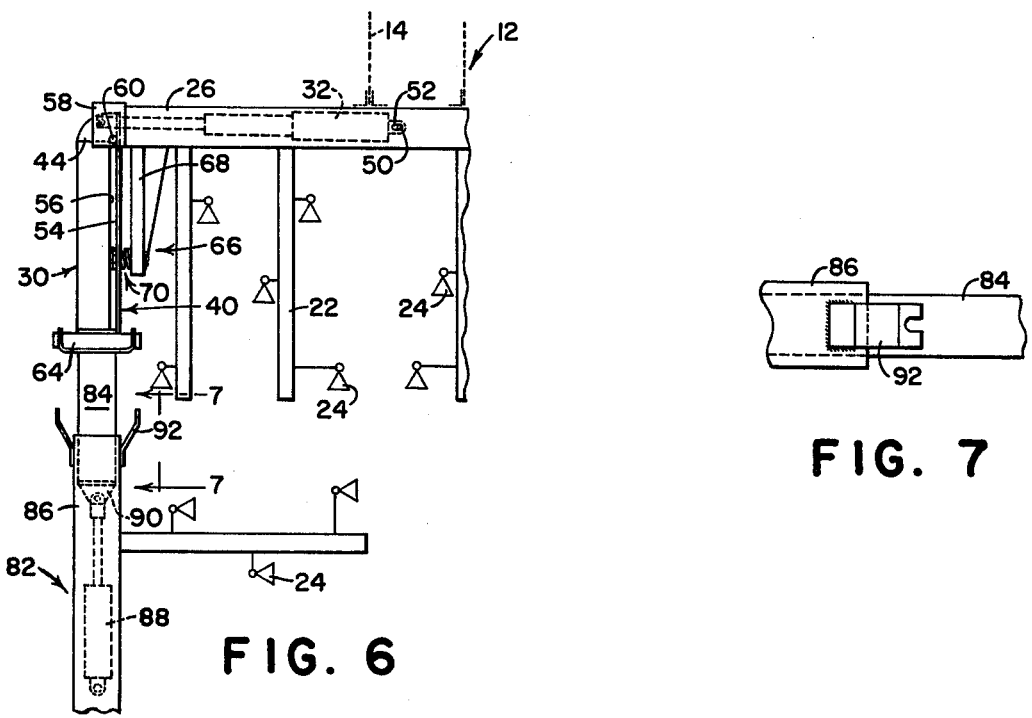
FIG. 6
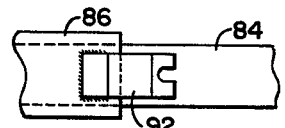
FIG. 7

REAR FOLDING IMPLEMENT

BACKGROUND OF THE INVENTION

Farm implements and toolbars designed to carry tillage tools are being manufactured in larger and wider sizes to improve the farmer's productivity. Toolbars designed to carry tillage tools are typically comprised of a center section that is positioned directly behind a tractor and normally include transversely extending outer sections pivotally connected at their respective inner ends to the center section. In some instances, there are as many as two additional outer sections or frames pivotally connected together and coupled with each outer end of the center section. Today a single tractor often pulls several transversely aligned implement sections which may extend in width as much as sixty feet from end to end.

One of the major problems encountered with these extremely wide implements occurs when the implement width must be reduced to permit transport over roads and through fence gates.

One method commonly used to move an extremely wide implement is to detach the implement from the tractor, move the tractor to one end of the implement, re-attach it and then transport the implement lengthwise with respect to its transverse dimension. The disadvantage with this type of implement is that there must be provided duplicate hitching structure. Further, the implement length to be transported must equal the working implement width and consequently, significant control and turning problems are encountered as it is moved along roads or through gates.

Another method commonly provided utilizes hydraulic cylinders between the center and outer sections to swingably raise the outer section vertically above the outer end of the center section. While this has proven somewhat successful for three section implements, folding mechanisms for implements having more than three sections become very expensive to build and maintain. It has also been common to rotate the implement sections forwardly about vertical pivots on opposite ends of the center section to positions alongside the tractor. Since the implements or tools mounted on the section or toolbar normally extend rearwardly, the overall width of the forwardly folded implement and tractor will equal the width of the tractor plus the depth of both implement sections and their tools. Often this width is too great for the transport problems mentioned. Further, no provision is made with this type of design for implements having more than three sections.

In view of the above-mentioned problems, it would be desirable to swing the outer sections rearwardly of the center sections. One of the major difficulties not overcome with respect to swinging the outer sections rearwardly occurs because the tools mounted on these sections normally project rearwardly. Consequently, when the outer sections are swung rearwardly, interference between the tools on the center section and the tools on the outer section occurs. Thus, there has not been a great deal of success with this method.

SUMMARY OF THE INVENTION

With the above in mind, the primary object of the present invention is to provide a multi-section rearwardly swing tool-carrying implement in which the tools on the outer sections do not engage or contact tools on the center section when the outer sections are rotated into their transport position.

It is also a main object of the present invention to provide on the center section carriers that may be shifted transversely to shift the outer sections transversely away from the center sections and thereby provide clearance between tools on the center and outer sections as each other section is rotated rearwardly. Each of the carriers is provided with a vertical pivot to which is attached the slide portion of the carrier and the inner end of the outer section. Upon the carrier being shifted to the outer end of the center section, the outer section may be rotated about the vertical pivot to narrow the implement transport width.

It is a more specific object of the present invention to provide a pair of transversely elongated carriers that are slidable with respect to the center section of the frame. These carriers are connected to the outer sections and are restrained against rearwardly swinging movement until shifted to the outer ends of the center section. At the respective inner end of each carrier is provided the pivot structure or suitable cam means enabling the carrier to be swung rearwardly. The carrier length is elongated sufficiently to provide adequate separation between adjacent tools on the center and outer section as the outer section tools are swung rearwardly of the tools on the center section during folding operations.

It is still a further object of the invention to provide this type of implement in combination with a tractor. The carriers are shifted transversely by means of hydraulic cylinders controlled from the tractor seat. Thus, a tractor may be driven forwardly after the carriers are shifted to the outer ends of the center section to facilitate the inward shifting of the outer sections about the respective vertical pivots. Also, after the implement has been transported to its desired location, the tractor may be utilized for helping the outer sections to swing forwardly to their transverse aligned position as the hydraulic cylinders cause the carriers to be positioned from the ends of the center section.

BRIEF DESCRIPTION OF THE DRAWINGS

FIG. 3 is a fragmentary and expanded elevational view of the carrier mechanism connecting the center and outer sections and taken along line 3—3 of FIG. 1.

FIG. 4 is a section view taken along lines 4—4 of FIG. 2.

FIG. 5 is an enlarged fragmentary plan view of a modified version of the invention.

FIG. 6 is a plan view similar to FIG. 5, but on a smaller scale showing the modified embodiment shown in FIG. 5 in a transport position.

FIG. 7 is an enlarged fragmentary view of the yoke brackets taken along lines 7—7 of FIG. 6.

DESCRIPTION OF THE PREFERRED EMBODIMENT

Figure 1:
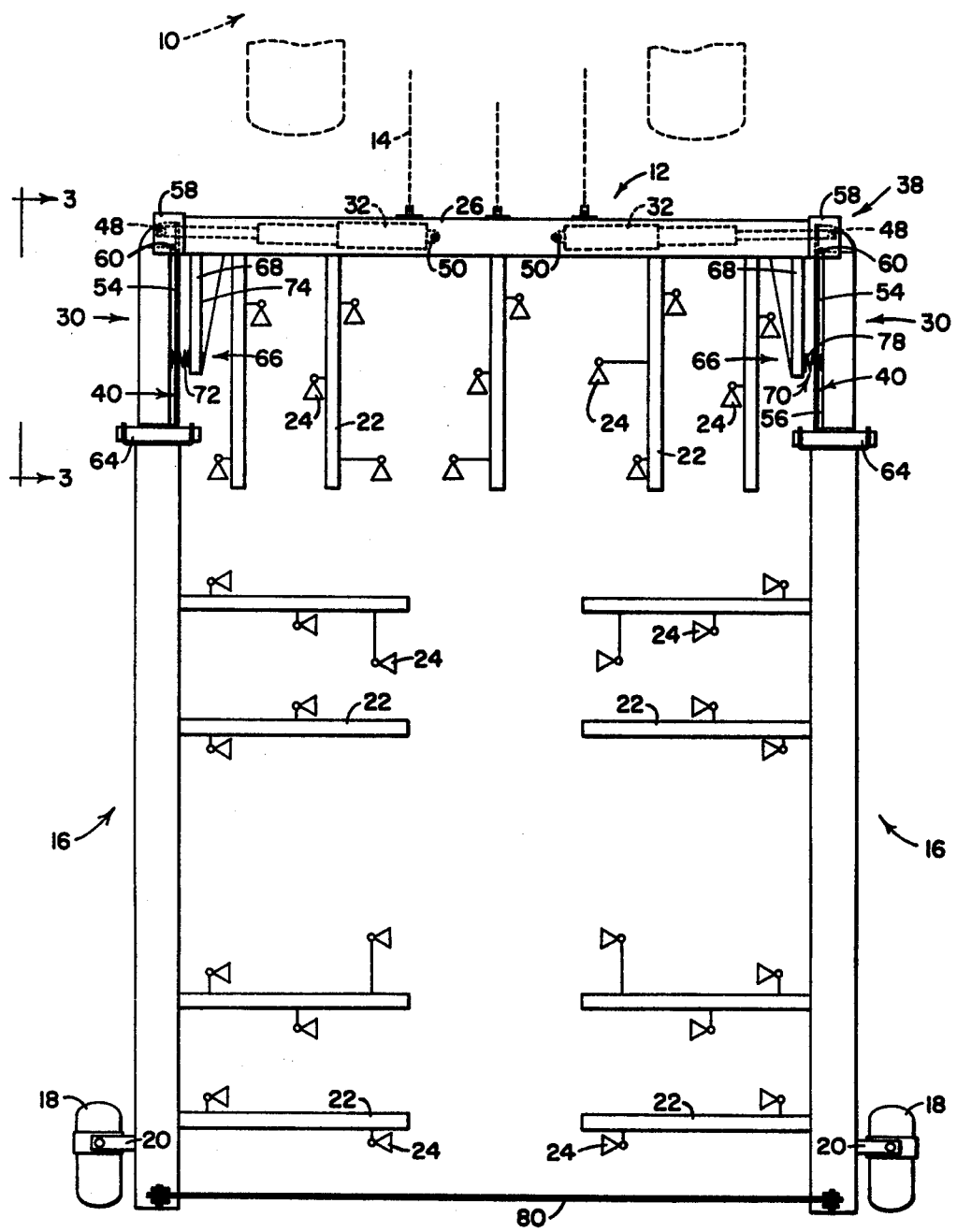
FIG. 1 is a plan view of a rear folding multi-section implement having its outer sections folded for transport.
Figure 2:
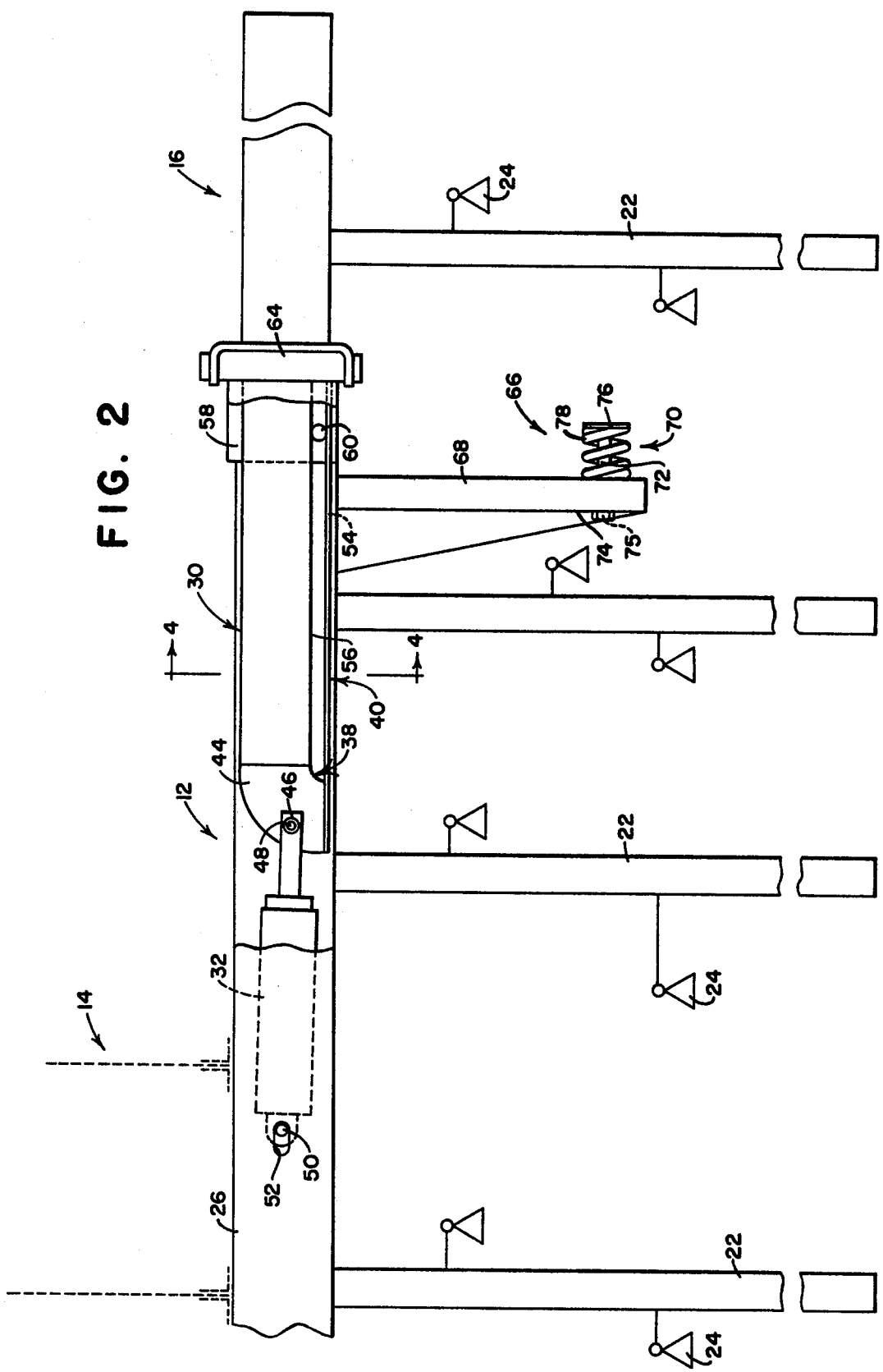
FIG. 2 is an enlarged fragmentary plan view illustrating the carrier in its operational position. Portions are broken away to show the internal mechanism.

The implement herein to be described is pulled by a tractor 10 having a conventional hydraulic system which enables the operator to activate the hydraulic power means provided on the implements that trail behind the tractor. The implement is illustrated in FIG. 1 in a transport configuration and includes a center section 12 having a hitch 14 connectible with the tractor 10. The center section 12 is connected to outer sections 16 which, as illustrated in FIG. 2, extend during operation transversely outwardly from opposite ends of the center section 12. The outer sections 16 have ground wheels 18 which are castered and which may be adjusted vertically with respect to the frame so as to raise and lower the outer sectionns 16 with respect to the ground. Wheel supports 20 are mounted on the outer sections 16 and project outwardly therefrom to the wheels 18. The center section 12 and two outer sections 16 carry rearwardly projecting tool supports 22 which in turn carry, for example, cultivator shovels 24. It should be understood that while the particular type of tool shown is a cultivator, other types of equipment, such as planters, chisel plows, and numerous others could operate satisfactorily in the present arrangement of implement sections.

Referring now to FIGS. 1, 2 and 4, the center section 12 is comprised of a hollow rectangular-shaped tube 26 that is sufficiently large to carry a mechanism within it. Fixed into the tube 26 at its top and bottom are sizing or lining plates 28. A carrier indicated by the reference numeral 30 is slidably carried within each end portion of the center section tube 26. Each carrier 30 is connected at its inner end with the ram portion of a three stage hydraulic cylinder 32 that has its base end secured to the center section 12 for limited transverse movement. The carriers 30 have upper and lower elongated channel members 34 and 36 and have a pivot structure 38 secured to the end and a guide means 40 including a slot secured along their rearward length. The essentially identical upper and lower channel members 34 and 36 are securely joined by vertical plate members 42 to form a rigid box-like structure.

At the inner and rearward end of each channel (as viewed in FIG. 2) is secured the pivot structures 38 for controlling swinging movement of the carrier when it is extended. The rearward vertical surface of the pivot structure 38 is rounded to abut on pin 60 and provide a pivot point about which the carrier 30 can swingably rotate. Each pivot structure 38 further includes upper and lower plate members 44 having a vertically disposed opening 46 through which pivot pin 48 passes and is connected with the outer end of the three stage cylinder 32. The opposite or inner end of the hydraulic cylinder 32 is carried on the vertical pin 50 which extends through transverse elongated slots 52 provided in the upper and lower surfaces of the center section 26 so as to permit limited transverse movement of the hydraulic cylinder 32 during transport operations as the trailing and folded outer sections swing slightly from side to side.

The guide means 40 is formed by a pair of vertically extending ribs 54 spaced rearwardly from the back side of the vertical plate member 42 of carrier 30. The ribs 54 define with that side of the carrier 30 an upright elongated slot 56 extending the length of the carrier 30. Carried at the outer end of the center section tube 26 on the top and bottom end portions are horizontal and rectangularly-shaped reinforcing plate structures 58 supporting between them a vertically disposed pin 60. This pin 60 rides in the slot 56 formed by ribs 54 as the carrier is shifted between its retracted and extended positions. The pin 60, as is best seen from viewing FIGS. 2 and 3, is closely adjacent the rear wall of the center section tube 26 so as to provide an axis of rotation about which the carrier 30 can rotate as extended. At the inner end of the slot 56 is provided the pivot structure 38 and stop surface whereat the vertical pin 60 will abut and seat and about which the carrier 30 rocks rearwardly.

As is apparent from FIGS. 2 and 3, the ram of the hydraulic cylinder 32 is connected to the carrier 30 at a point which is forwardly of the pin 60 about which the carrier will rotate when extended. It is this length designated 62 in FIG. 3 which serves as the moment arm for the forces exerted by the hydraulic cylinder 32 to rotatably swing the carrier 30 about the pivot pin 60 carried by the center section tube 26.

Fixed to the outer end of each carrier 30 and horizontally perpendicular thereto is a tube which carries an elongated pivot pin 64. To this pivot pin 64 is joined the outer section 16. About the horizontal axis formed by this pivot pin 64, relative vertical movement between the center section 12 and outer section 16 is permitted as uneven ground contours are encountered.

Extending rearwardly from each end of the center section 12 are stops 66 against which the folded outer section 16 can abut and be resiliently restrained against the inward and transverse movement encountered during transport. The stop 66 includes a rearwardly extending elongated bracket structure 68 carrying at its unsupported end a cushion device 70. The cushion device 70 is comprised of a central rod 72 slidably carried in vertical plate 74 of the bracket structure 68 and secured thereto by nut 75. The outer end of the rod 72 has a flat head portion 76 and a helical spring 78 coaxially surrounds the rod 72 to bear against the vertical plate 74 at its one end and the flat head 76 at its other end.

In operation, the outer sections 16 are transversely aligned with the center section 12 as illustrated in FIG. 2. When the operator is ready to fold the outer sections 16 rearwardly, he activates the three stage hydraulic cylinders 32 to begin extending the rams. As the cylinder rams are extended, the carriers 30 will slidably shift outwardly guided by the liners 28, the tube 26 and the pivot pin 60 carried at the outer end of the center section 12. Caster wheels 18 provided on the outer sections 16 facilitate the transverse movement of the outer section 16 as it is shifted by the extension of the hydraulic cylinder 32 and movement of the carrier 30. As each carrier 30 reaches the fully extended position, the pivot structure 38 at the inner ends of each slot 56 abuts against the pin 60 providing a pivot point about which the carrier 30 swings rearwardly. Further extension of the hydraulic cylinder 32 will cause the carrier 30 to swing rearwardly about the pivot pin 60 and full extension of the cylinder causes the outer section 16 to contact the bumper means 66. The operator then attaches a rigid bar 80 to the rearward ends of the trailing outer sections 16 to limit lateral movement of the sections 16 during transport.

Illustrated in FIGS. 5 and 6 is a modified version of the present invention which includes a means 82 for further separating the tools on the outer section from those on the center section. This means or mechanism 82 includes a telescoping arm 84 slidably carried within the inner end portion of the outer toolbar frame 86. Each arm 84 is connected at its outer end to a two stage hydraulic cylinder 88 carried within the outer section toolbar frame 86 and is joined at its inner end to the horizontal pivot 64 secured to the outer end of carrier 30. The hydraulic cylinder 88 is pinned at its base end within the toolbar frame 86 and connected at its ram end to an ear 90 carried by the arm 84. A pair of yoke brackets 92 are provided on opposite sides of toolbar 86.

The brackets are bifurcated at their inner ends to receive the horizontal pin of the pivot structure 64. When retracted, as illustrated in FIG. 5, the horizontal pivot 64 is seatably positioned within the yoke brackets 92 carried by the toolbar frame 86. This yoke connection serves to minimize twisting damage to the arm or carrier 30 during operation.

In operation, the modified embodiment illustrated in FIGS. 5, 6 and 7 is utilized similarly to the preferred embodiment illustrated in FIGS. 1–4. However, prior to initiating the folding procedure, the arm 84 must be telescoped out of the toolbar frame 86 to laterally separate the outer section tools from the center section tools. Then the folding process is completed as is that of the preferred embodiment. To unfold, the procedure is reversed, with the arm 84 being telescoped into the toolbar frame 86 after the outer section 16 has been unfolded to a position transversely aligned with the center section 12.

I claim:

1. In the combination of a foldable agricultural implement having a transverse main section and at least one outer section normally aligned transversely with the main section, each section having rearwardly projecting tools thereon, the improvement comprising: a transversely elongated carrier slidably supported for transverse shifting on the main section and shiftable between a transverse retracted and an extended position with respect to the transverse outer end of the main section; vertical pivot means between the carrier and main section about which the carrier swings to and from a rearwardly projecting position upon it being shifted to and from its extended position; means connecting the inner end of said outer section with the carrier for movement therewith; powered means carried by the main section for shifting the carrier between its transverse retracted position whereat the tools on the outer section project rearwardly and are aligned with the tools on the main section and its extended and rearwardly projecting position whereat the tools on the outer section project transversely behind the tools on the main section.

2. In the combination of a foldable agricultural implement having a mobile transverse main section and at least one outer section, each section having rearwardly projecting tools thereon, the improvement residing in means for moving the outer section between first transversely extending operational and second fore-and-aft transport positions comprising: a carrier supported on and shiftable in a transverse direction on the main section between a retracted position and an extended position in which it is spaced outwardly of said retracted position; means connecting the carrier with the inner end of the outer section; power means for shifting the carrier; and means for swinging the carrier and its outer section between transverse and rearwardly projecting positions upon the carrier being shifted between its retracted and extended positions so as to swing the tools carried on the outer section between a rearwardly projecting position transversely spaced from the tools carried by the main section and a transversely projecting position rearwardly of the main section.

3. In a foldable agricultural implement of the type having a transverse center section and at least one outer section, the improvement comprising: a carrier slidably supported on the end of the center section and shiftable between a first retracted position whereat the carrier is inwardly positioned with respect to the end of the center section and a second extended position whereat the carrier is transversely outwardly extended with respect to the end of the center section; means connecting the inner end of the outer section with the carrier; powered means carried by the center section for shifting the carrier between its first and second positions; an upright pivot structure operative between the carrier and center section; and means acting between the center section and carrier for restraining swinging movement of the carrier about the pivot structure except when said carrier is in its second position.

4. The invention defined in claim 3 wherein the pivot structure includes an upstanding pin carried at the end of the center section, and engageable with a part of said carrier when it is in its second position.

5. The invention defined in claim 4 wherein said carrier is further characterized as having an elongated vertical slot extending longitudinally from the pivot structure and said upstanding pin extends through said slot.

6. The invention defined in claim 4 wherein the carrier is comprised of an L-shaped member and pivotal swinging of the carrier about the pin occurs as contact is made between the pin and the interior juncture of the legs of said L-shaped member.

7. The invention defined in claim 3 wherein said powered means is a hydraulic cylinder pivotally anchored at one end with the center section and at its other end with the carrier at a point spaced fore and aft from said pivot structure.

8. The invention defined in claim 3 wherein there is further provided a horizontal pivot between the carrier and outer section.

9. The invention defined in claim 3 where the end portion of the center section adjacent the outer section includes a transverse elongated opening wherein the carrier is positioned for transverse shiftable movement.

10. The invention defined in claim 3 further characterized by the provision of a resilient restraint means acting between the center and outer section when the carrier is in its second position.

11. The invention defined in claim 10 wherein the restraint means includes a rearwardly extending arm carried at the end of the center section, said arm supporting a laterally projecting spring means engageable with the outer section when said carrier is moved to its second position.

12. In a foldable agricultural implement having a transverse center section and an outer section movable between an operating transversely extending position and a rearwardly extending transport position, the improvement comprising: a carrier slidably supported on the center section and transversely shiftable between a first retracted position spaced inwardly from the end of the center section and a second extended position at the end of the center section; means connecting the inner end of the outer section with the carrier; powered means carried by the center section for shifting the carrier between its first and second position; a vertically disposed stop means carried at the outer end of the center section; an upright pivot structure carried at the inner end of the carrier and engageable with the stop means when the carrier is shifted to its second position; and means acting between the carrier and the center section restricting swinging movement of the carrier except when said carrier is in its second position.

13. The invention defined in claim 12 wherein the carrier includes an L-shaped member and the pivot structure is formed by the interior juncture of the legs of said member.

14. The invention defined in claim 13 wherein the stop means is a vertically disposed pin abuttable with the juncture as the carrier is moved to its second position.

15. The invention defined in claim 13 wherein the powered means is a hydraulic cylinder pivotally anchored at one end with the center section and at its other end with the inner end of the carrier at a point horizontally spaced from the juncture.

16. A foldable agricultural implement comprising: a center section frame having an elongated opening in its outer end portion; a carrier positioned in the opening slidably supported within the frame section for movement between a first retracted position spaced inwardly from the end of the center section and a second extended position near the end of the center section; an outer frame section having an inner end adjacent the end of the center section; means connecting the inner end of the outer section with the carrier; stop means on the center section near its end and engageable with the carrier to limit longitudinal movement of the carrier with respect to the center section while permitting lateral swinging movement of the carrier upon said carrier being in its second position; and powered means between the center section and carrier for shifting the carrier between its first and second positions and swinging the carrier and outer section.

17. The invention defined in claim 16 wherein the powered means includes a hydraulic cylinder in said opening, said cylinder pivotally anchored at one end with the center section and connected at its other end with the carrier horizontally spaced from the pivot structure of said carrier.

18. The invention defined in claim 16 wherein the guide means include mounting means carried within the center section in which the carrier is linearly restrained while in its first position.

19. In a foldable agricultural implement of the type having a transverse main frame with an elongated opening in its outer end and at least one outer section normally transversely aligned therewith, the improvement residing in means for shiftably moving said section between its first transverse position and a second rearwardly extending position comprising: an upstanding pivot pin carried near the end of the center section; a transversely shiftable horizontally disposed L-shaped carrier positioned within said opening and connected at its outer end with the outer section, said carrier having one leg portion thereof engageable with the pivot pin, said carrier being shiftable to and from a position in which the interior juncture between the legs of said carrier is abuttable with the pivot pin; and a hydraulic cylinder extending between the center section and carrier for shiftably moving the latter, the axis of said cylinder being offset fore and aft from the pivot pin.

20. The invention defined in claim 19 wherein the inner end of the outer section includes a horizontal pivot member.

21. The invention defined in claim 19 further characterized by the provision of a resilient restraint means acting between the center and outer section when the latter is in a transport position.

22. In a tractor-pulled implement comprising: a frame having a central transverse extending section and at least two outer sections extending transversely from opposite ends of the central section; rearwardly projecting tools carried on said central and outer sections; a pair of inwardly extending carriers mounted on the respective outer sections, and supported on the central section to shift transversely on the central section; vertically disposed pivot structures between the carriers and central section at opposite ends of said central section; and hydraulic means on the central section operative from the tractor for shifting the respective carriers transversely outwardly on the central section and for swinging said carriers and outer sections about the pivot structure to a fore-and-aft extending position whereat the tools carried on the outer sections project transversely behind the tools carried on the central section.

23. In a tool-carrying implement, a frame having a central transverse extending section and at least two outer sections extending transversely outwardly from opposite ends of the central section, each of said sections having rearwardly projecting implements mounted thereon; a pair of carriers supported on the central section and adapted to shift transversely on the section to opposite ends thereof; vertical pivot structures between the carriers and central section for swinging the respective carriers rearwardly; means on each of the outer sections adjacent the inner ends thereof connecting the respective ends to the carriers; means on the central section for shifting the carriers transversely between inner positions in which the carriers are spaced from the ends of the central section and outer positions in which the carriers are at the outer ends of the central section and for swinging the carriers about the vertical pivot structures; and means on the central section restraining swinging of the outer sections on their respective vertical pivots except upon said carriers being in their outer positions.

24. The invention defined in claim 23 in which said carriers are transversely elongated so that when the carriers and their respective outer sections are swung rearwardly the implements on said outer sections shall swing behind the implements on the central section.

25. A foldable agricultural implement comprising: a center section having a transversely elongated frame with hollow end portions; an outer frame section transversely aligned with each end of said central section, each outer frame section including an inner end slidably receiving in the adjacent hollow end of said center section frame; vertically extending stop means carried within each hollow end portion and near the end thereof; vertical pivot means supported on each outer frame inner end; guide means carried along the inner end of each outer frame and extending along said inner end from the vertical pivot means beyond said stop means; and a hydraulic cylinder acting between the center section frame and each inner end, the axis thereof being offset fore and aft from said stop means, said cylinder acting to slidably shift each pivot means transversely into and out of abutment with its respective stop means and for swinging the respective outer sections about their respective stop means after said pivot means has abutted the stop means.

* * * * *

UNITED STATES PATENT OFFICE
CERTIFICATE OF CORRECTION

Patent No. 4,098,347      Dated 4 July 1978

Inventor(s) Darrel Lee Honnold

It is certified that error appears in the above-identified patent and that said Letters Patent are hereby corrected as shown below:

Column 8, line 47, delete "central" and insert --center--.

Column 8, line 49, delete "receiving" and insert --received--.

Signed and Sealed this

Twelfth Day of June 1979

[SEAL]

Attest:

RUTH C. MASON
*Attesting Officer*

DONALD W. BANNER
*Commissioner of Patents and Trademarks*